(12) United States Patent
Jincheleau et al.

(10) Patent No.: US 8,919,043 B2
(45) Date of Patent: Dec. 30, 2014

(54) DEVICE FOR CLOSING OFF AN OPENING HAVING FLEXIBLE HOLDING ELEMENT

(75) Inventors: Michel Jincheleau, Moncoutant (FR); Regis Leboeuf, Les Landes Genusson (FR)

(73) Assignee: Advanced Comfort Systems France SAS-ACS France, Bressuire Cedex (FR)

( * ) Notice: Subject to any disclaimer, the term of this patent is extended or adjusted under 35 U.S.C. 154(b) by 0 days.

(21) Appl. No.: 13/806,346

(22) PCT Filed: Sep. 22, 2010

(86) PCT No.: PCT/EP2010/063992
§ 371 (c)(1),
(2), (4) Date: Mar. 6, 2013

(87) PCT Pub. No.: WO2011/160701
PCT Pub. Date: Dec. 29, 2011

(65) Prior Publication Data
US 2013/0167445 A1     Jul. 4, 2013

(30) Foreign Application Priority Data
Jun. 21, 2010   (FR) .................................. 10 54926

(51) Int. Cl.
| E06B 1/00 | (2006.01) |
| E06B 3/46 | (2006.01) |
| B60J 1/16 | (2006.01) |
| E05D 15/10 | (2006.01) |
| E05F 11/53 | (2006.01) |
| E06B 3/30 | (2006.01) |
| E06B 7/16 | (2006.01) |

(52) U.S. Cl.
CPC ... *E06B 3/46* (2013.01); *B60J 1/16* (2013.01); *E05D 15/1042* (2013.01); *E05F 11/535* (2013.01); *E06B 3/30* (2013.01); *E06B 7/16* (2013.01); *E05Y 2600/60* (2013.01); *E05Y 2900/55* (2013.01)
USPC .......................... 49/380; 49/404; 296/146.16

(58) Field of Classification Search
CPC ...... B60J 1/16; E05D 15/1042; E05F 11/535; E06B 3/46
USPC ........... 49/380, 413, 414, 127, 128, 130, 404, 49/408, 452; 296/146.16, 155, 216.04, 296/213
See application file for complete search history.

(56) References Cited

U.S. PATENT DOCUMENTS 3,821,865 A * 7/1974 Steinke ........................... 49/404
5,775,029 A * 7/1998 Buening ......................... 49/360
(Continued)

FOREIGN PATENT DOCUMENTS

EP       0778168       6/1997
EP       0857844       8/1998
(Continued)

*Primary Examiner* — Katherine Mitchell
*Assistant Examiner* — Scott Denion
(74) *Attorney, Agent, or Firm* — Hamre, Schumann, Mueller & Larson, P.C.

(57) ABSTRACT

The invention relates to a device for closing off an opening formed in a structure, comprising an essentially flat fixed part in which an aperture is defined, and at least one sliding panel which an aperture is defined, and at least one sliding panel which is guided along two rails mounted on one face of said fixed panel, between at least a closed position that closes off said aperture and an open position which uncovers said aperture. At least one of said rails at each of its ends bears a closure end piece to which a first end of a flexible or semi rigid first element is secured, the second end of which element is intended to be secured to said structure.

12 Claims, 5 Drawing Sheets

(56) References Cited

U.S. PATENT DOCUMENTS

| | | | | |
|---|---|---|---|---|
| 5,809,706 | A * | 9/1998 | Neaux | 52/204.51 |
| 6,810,622 | B2 * | 11/2004 | Oberheide | 49/362 |
| 8,485,595 | B2 * | 7/2013 | Maltaverne et al. | 296/213 |
| 2008/0263960 | A1 * | 10/2008 | Murphy et al. | 49/408 |
| 2010/0122495 | A1 * | 5/2010 | Lahnala | 49/358 |
| 2011/0006558 | A1 * | 1/2011 | Giret et al. | 296/146.15 |
| 2012/0167469 | A1 * | 7/2012 | Maltaverne et al. | 49/360 |
| 2012/0228900 | A1 * | 9/2012 | Maltaverne et al. | 296/213 |
| 2013/0047513 | A1 * | 2/2013 | Lahnala | 49/168 |

FOREIGN PATENT DOCUMENTS

| | | |
|---|---|---|
| EP | 1048501 | 11/2000 |
| EP | 1621379 | 2/2006 |
| EP | 2189313 | 5/2010 |
| FR | 2787498 | 6/2000 |
| FR | 2937669 | 4/2010 |
| JP | 50-049116 U | 5/1975 |
| WO | WO 2007/141314 | 12/2007 |
| WO | WO2010/146185 | 12/2010 |

* cited by examiner

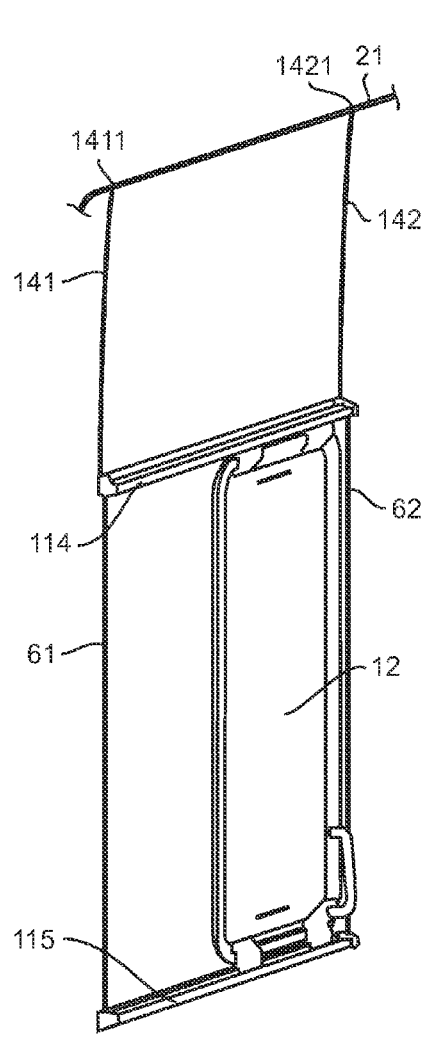
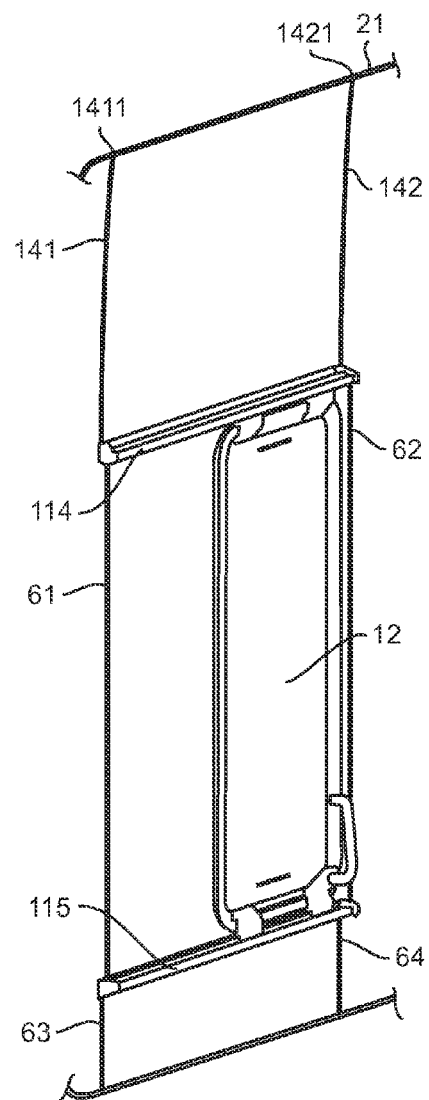
Fig. 6A  Fig. 6B
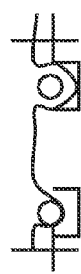
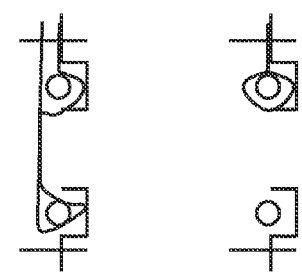
Fig. 7A  Fig. 7B  Fig. 7C  Fig. 7D

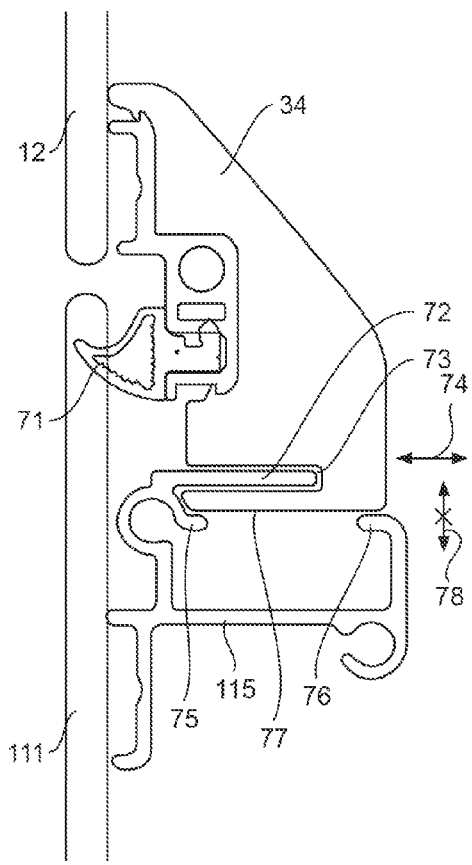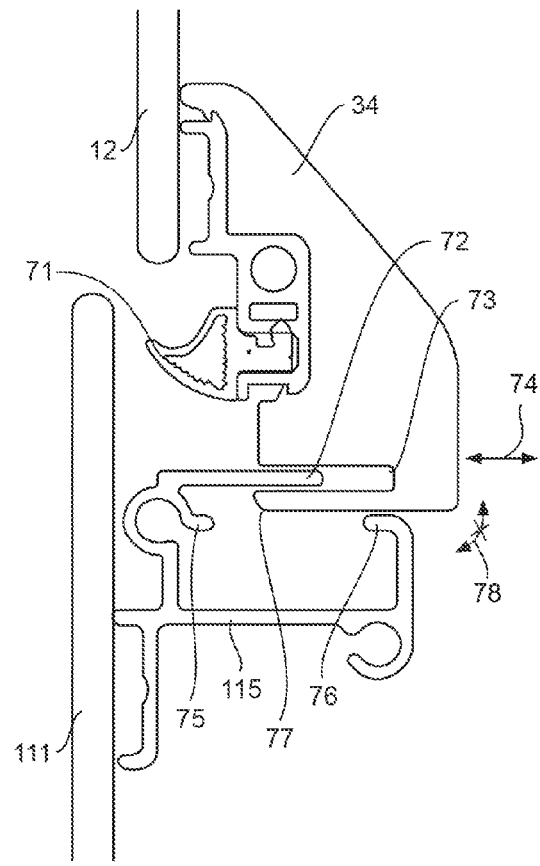
Fig. 8A　　　　　　　　Fig. 8B
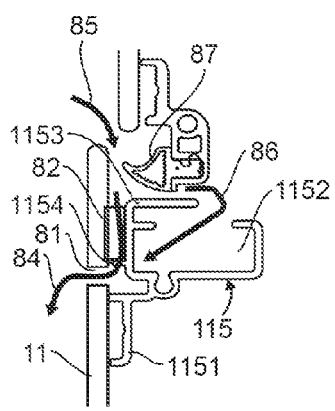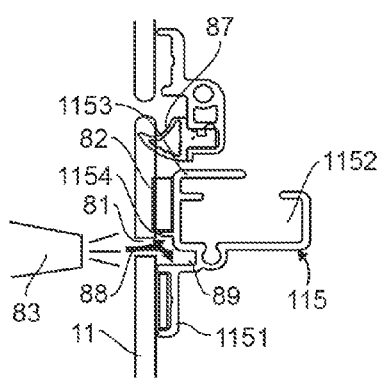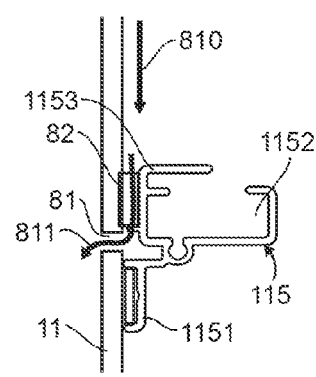
Fig. 9A　　　Fig. 9B　　　Fig. 9C

DEVICE FOR CLOSING OFF AN OPENING HAVING FLEXIBLE HOLDING ELEMENT

1. FIELD OF THE INVENTION

The field of the invention is that of the equipment of openings, used especially in motor vehicles. More specifically, the invention relates to devices for closing off an opening prepared in a structural element, for example in the bodywork of a vehicle or in a door of the vehicle, and comprising a sliding mobile part capable of releasing or closing an aperture, in presenting a flush aspect when seen from the exterior. The invention can also equip other types of structures such as caravans, camping cars, coaches and buses, minibuses, trucks, vans, ships etc.

Such devices, which have been developed for many years by the Holder of the present application, are known for example as "flush openings". In other words, these devices are designed so that, seen from the exterior, they present a flush or almost flush appearance between the bodywork, or more generally the wall or the structure, and the fixed panel of the device.

2. PRIOR-ART TECHNIQUES

The principle of this technique is described especially in the patent documents EP-0 778 168 and EP-0 857 844. The device for closing off (here below called a "flush opening" device) presented in these documents comprises a fixed part and a part that is mobile relatively to this fixed part, or sliding panel. The mobile part is connected to the fixed unit by functional elements which provide the requisite mobility and are added on to the face of the fixed part facing towards the interior of the vehicle.

These functional elements or rails fulfill a function of guiding and holding the mobile panel. They are placed on the face oriented towards the interior of the vehicle, so as to be sufficiently removed from the edges, or the periphery, of the fixed part so that this periphery can be fixedly joined directly to the edges of the opening without the rails interfering with each other. It is thus possible to do away with the need for the presence of a linking frame between the edges of the opening and the fixed part.

This fixed part can be made in the form of one or more elements (placed side by side in a same plane) for example made of glass or polycarbonate.

Such a flush opening can be mounted fully independently of the vehicle and can be added on from the exterior, into the housing defined for this purpose by the opening, or the housing, defined in the bodywork, or more generally in the wall. The edges of the fixed part are fixedly joined, for example by means of a glue seal, to the edges of the opening, without any other intermediate linking element.

Aesthetically, when seen from the exterior, the flush opening has a smooth flush aspect because no frame is needed on the outline of the aperture formed in the fixed assembly.

In order to obtain a sliding of the mobile part which is generally constituted by a transparent panel, a guide device is therefore provided, comprising a first and second guide rails mounted so as to be fixed on to the fixed part (or fixed structure) of the opening, on both sides of the aperture closed off by the mobile panel. This panel is mounted on the rails to slide for example in a longitudinal direction in a sliding plane between one (or more) open positions and one closed position in which it closes off the aperture.

To maximize the flush aspect, it has been proposed that, in the closed position, the mobile panel will be inscribed in the plane of the fixed part in passing from an intermediate cleared position, in the sliding plane, when it faces the aperture and is cleared from it, to the closed position.

It can be noted that the term "plane" must herein be understood in a broader sense: the plane formed by the opening is sometimes curved in one or even two directions (this also justifies the use, in certain cases, of the term "substantially" in the description and the claims).

3. DRAWBACKS OF THE PRIOR ART SOLUTIONS

Flush openings are winning major success in many applications, especially because of the simplicity of their manufacture and assembly, and the aesthetic appearance that they procure.

However, they introduce major safety risks if certain precautions are not taken. Indeed, the rails are fixed only to the fixed part of the flush opening and not, as previously, to a frame which is itself fixed to the bodywork. Hence, if there is a breakage of the fixed part, for example because of an accident or the receiving of a projectile, for example a pebble discharged by another vehicle, the rails and above all the mobile panel are no longer held (the fixed part, especially when it is made of glass, breaks up into a multitude of small-sized pieces) and can become elements highly dangerous to the occupants of the vehicle. For example, the mobile panel which is no longer held becomes a loose part that can get hurled into the interior of the vehicle.

This situation is of course not acceptable and is prohibited by the standards, especially at the European level. Thus, the European regulation EC43 specifies that, in such a situation involving broken glass, the hurled elements have to be small-sized, smaller than 3 $cm^2$, which of course is not the case with the mobile panel which is one of the elements hurled when the fixed part is broken.

The Holder of the present patent application has taken account of this risk from the very outset and has proposed a solution, presented in the document EP-0 778 168 mentioned here above. This solution consists in making extensions which extend from the rails to the edge of the fixed part (more specifically up to the zone where this fixed part is fixedly joined to the edges of the opening made in the bodywork or the structure of the vehicle).

Thus, during the assembly of the vehicle, these extensions are placed (sandwiched) between the edge of the opening and the edge of the fixed panel and are coated with the glue seal (in the case of fixed joining by gluing). The dimensions of these extensions are small enough so that they disturb neither the efficiency of the joining of the fixed part to the edge of the opening nor the tight sealing quality. In the event of breakage of the fixed part, these extensions remain bonded to the edge of the opening. Consequently, the rails remain in place as does the mobile panel, averting risks of injury for the occupants of the vehicle from any hurling of these elements.

In the embodiment illustrated in the document EP-0 778 168, these extensions extend along the axis of the rails. The Holder has then developed extensions that extend perpendicularly to the rails (upwards for the upper rail and downwards for the lower rail). Such extensions are present in different vehicles since 1998. The Holder also proposed variants of assembly (extensions fixedly joined to the rails, for example by being clipped on) and complementary applications such as water draining.

This technique is efficient but nevertheless has certain drawbacks. First of all, it implies a design and specific manufacture for each type of opening. Indeed, the dimensions and position of the extensions and more generally of the rails is specific to each opening depending especially on the dimensions of the opening (and therefore the fixed part) and on the position and dimensions of the aperture in the opening.

Besides, as regards security, this technique can be insufficient. Indeed, the rigidity of the extensions can in certain cases be insufficient to maintain the rails perfectly in place and, in this case, the mobile panel can get detached from the rails and despite the extensions, it can become a projectile.

Finally, the cost of manufacturing such a flush opening and these complementary safety apparatuses remains relatively high, especially for constructing vehicles of low cost and/or varied configurations, implying variable shapes of openings.

4. GOALS OF THE INVENTION

The invention is aimed especially at overcoming the drawbacks of the prior art referred to here above.

More specifically, it is a goal of the invention to propose a technique for improving the security of the occupants of a vehicle equipped with one or more flush openings.

It is another goal of the invention to provide a technique of this kind that is simple and costs little to implement during manufacture and/or mounting on a vehicle.

It is also a goal of the invention to provide a technique of this kind according to at least one embodiment, making it possible in a simple and efficient way to manufacture flush openings with different dimensions.

According to another embodiment, it is also a goal of the invention to provide such a technique, ensuring tight sealing while at the same time enabling the condensation water that appears inside the vehicle to be removed.

It is yet another goal of the invention to provide a technique of this kind that, as far as possible, keeps all or a portion of the advantages of the flush openings already developed by the Holder of the present application and especially:
  a flush aesthetic quality;
  aerodynamic features;
  ease and limited cost of manufacture;
  ease and limited cost of assembly.

5. GENERAL PRINCIPLES OF THE INVENTION

These goals as well as others that shall appear here below are achieved according to the invention by means of a device for closing off an opening made in a structure, or flush opening, comprising a fixed, essentially plane part in which an aperture is defined and at least one sliding panel guided along two rails mounted on a face of said fixed panel, between at least one closed position, closing off said aperture, and an open position releasing this aperture.

According to the invention, at least one of said rails, at each of its ends, carries a closing tip to which a first end of a first flexible or semi-rigid element is fixedly joined, the second end of this element being intended for being fixedly joined to said structure.

The expression "flexible or semi-rigid" is herein opposed to "rigid" and therefore implies a capacity for tolerating a shift (at least a slight shift) of the rail and of the mobile panel.

Thus, in the event of breakage of the fixed part, this rail remains suspended on the edge of the opening, maintaining the panel fixedly, so that it is not released and hurled into or out of the structure. However, it is not necessary, for each type and especially for each dimension of rail, to provide for special means at specific locations. Indeed, the flexible or semi-rigid elements are fixedly joined to the tip and not directly to the rails. This makes it possible to cut out the rails to the desired dimension and then to attach the tips to their ends.

Said rail can especially be made out of a structural metal element capable of being cut out to different lengths.

Each flexible or semi-rigid element can for example be a strap or a cable.

Each flexible or semi-rigid element is preferably sized so that said second end can be glued to the edge of said opening by means of a glue seal intended for fixedly joining said fixed part to said structure.

Said closing tips can be fixedly joined to said rail by being clipped on and/or screwed on thus enabling fast and easy dismantling.

According to one particular embodiment, said first end forms a loop around a holding tab formed in said tip. This approach enables simple and efficient assembly. Other fixed joining techniques (gluing, clamping, soldering, etc) can of course be envisaged.

According to one mode of implementation, at least one of said tips is fixedly joined to a second flexible or semi-rigid element extending up to a tip of a second rail so as connect the two rails.

This makes it possible to retain not only the first rail but also the second rail and therefore to reinforce safety. It can also be planned that the flexible or semi-rigid elements will extend throughout the height of the opening to maintain the two rails. It is also possible that each rail will be retained by its own flexible or semi-rigid elements.

According to one particular embodiment, at least one of said rails and/or said sliding panel carries safety-bolt means preventing the disconnection of said rail and said sliding panel.

In this way, even in the event of a relatively major shock and shifting (for example a swinging motion) of the rail, the mobile panel remains suspended to the edge of the opening.

In particular, the safety bolt means may comprise complementary elements formed on the one hand on said rail and on the other hand on a frame of said sliding panel so as to eliminate or limit at least one degree of freedom between said rail and said frame (in an essential vertical direction).

According to one variant, said safety bolt means may comprise complementary elements formed on the one hand on said rail and on the other hand on a swaying support fixedly joined to the frame of said sliding panel so as to eliminate or limit at least one degree between said rail and said frame.

According to another aspect of the invention, a permeable seal can be placed between said fixed part and said lower rail.

Such a seal, because of its permeability, makes it possible to drain off the condensation water but ensures an efficient barrier against liquid coming from the exterior, especially through a pressurized jet.

Said seal can especially be made out of open-cell foam.

According to one particular embodiment, said seal is placed above at least one passage of water pierced into said fixed part. Thus, the condensation water, after having crossed the seal, can be removed to the exterior through this passage or these passages.

Such a device according to the invention can be implemented on numerous types of structures and/or walls having an opening. In particular, the invention pertains to automobile vehicles comprising at least one device for closing off as described here above.

6. LIST OF FIGURES

Other features and advantages of the invention shall appear more clearly from the following description of a preferred embodiment of the invention given by way of a simple illustratory and non-exhaustive example and from the appended drawings of which:

Figure 4:
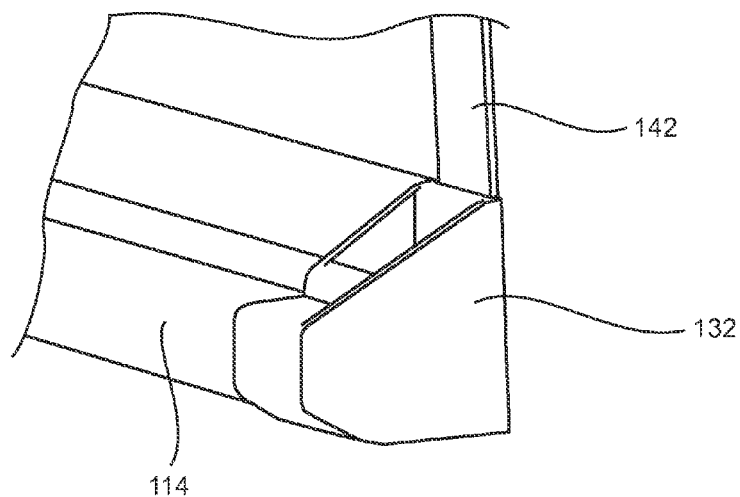
Figure 5A:
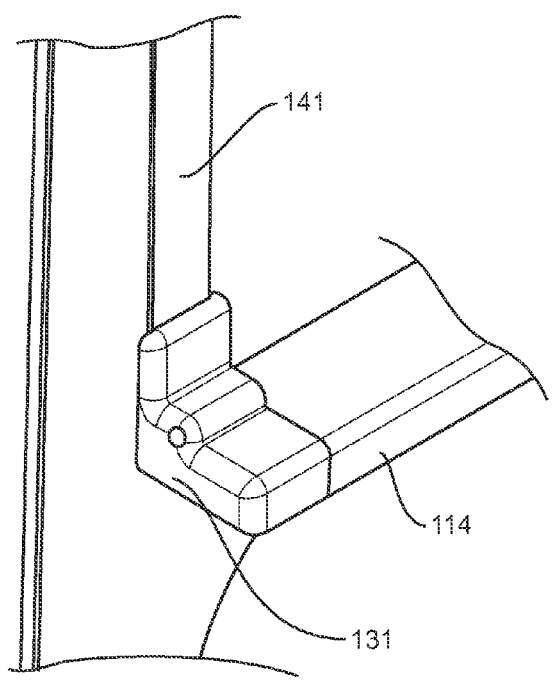
Figure 5B:
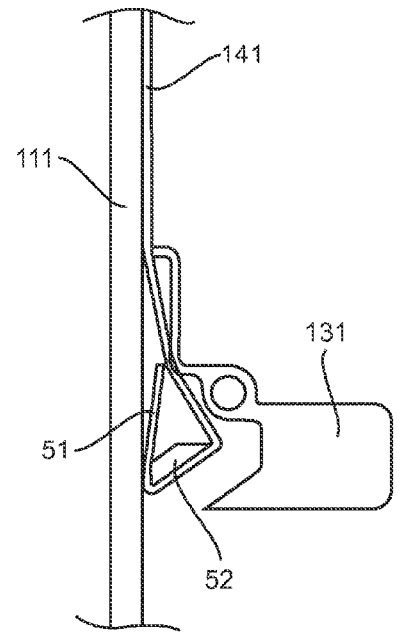

FIG. 4 presents a first embodiment of a tip according to the invention;

FIGS. 5A and 5B illustrate a second embodiment of a tip according to the invention, FIG. 5B being a view in section;

FIGS. 6A and 6B present two variants of implementation in which the lower rail is also held by straps;

FIGS. 7A to 7D schematically illustrate four modes of holding the upper and/or lower rails;

FIGS. 8A and 8B present one embodiment of safety-bolt means;

FIGS. 9A to 9C illustrate the implementation of permeable tight-sealing means at the lower rail.

7. DESCRIPTION OF A PARTICULAR EMBODIMENT

Figure 1:
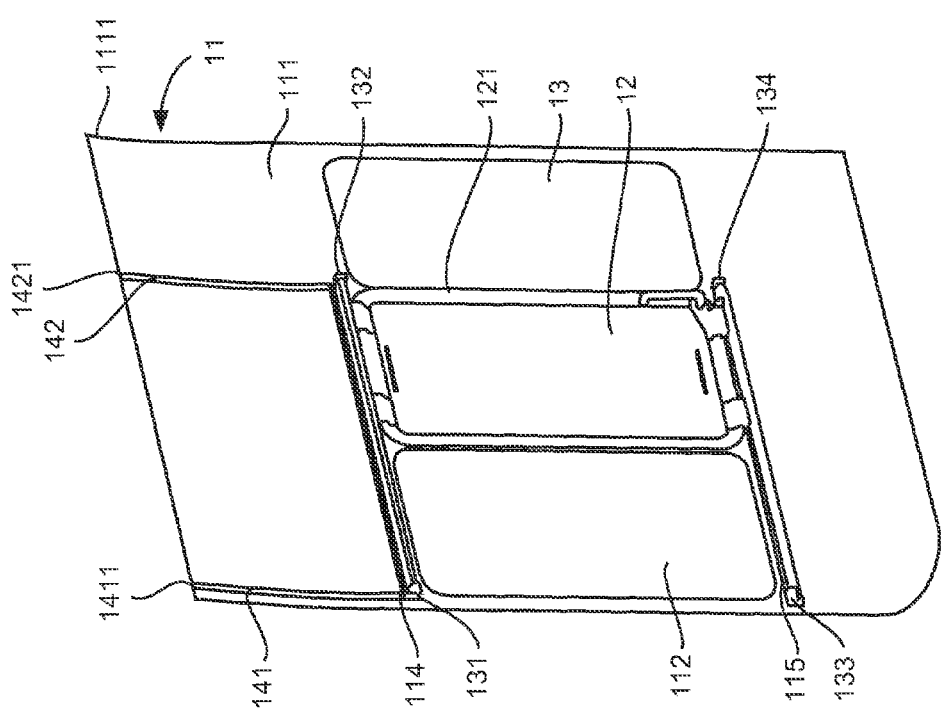
FIG. 1 illustrates a flush opening according to the invention, seen from the side corresponding to the interior of the vehicle in which it will be mounted.

As can been seen in FIG. 1, which presents a flush opening with a sliding mobile panel, a flush opening takes the form of a closing-off unit or device, ready to be placed in an opening (i.e. an aperture or a hole) made in the bodywork or a door or more generally in the structure of a vehicle or more generally a wall that has to receive a device for closing off provided with a hatch.

Such a device for closing off therefore has a fixed part 11, i.e. one that remains immobile relatively to the structure that receives it, and a mobile panel that is mobile in sliding, or sliding panel 12, mobile relatively to the fixed part 11.

The fixed part 11 can especially be made out of glass or polycarbonate, in one or more elements. In the embodiment of FIG. 1, it has a structural element 111 defining the outline of the device (designed to coincide with the outline 1111, or perimeter, of the opening). This element is generally opaque and for example covered with a silk-screen print.

It can be noted that the outline 1111 is free of any element and especially of a linking frame or similar elements for linking with the bodywork or the wall so as to enable the fixed part to be glued directly to the edges of the opening. Other fastening modes can of course be envisaged.

The structural element 111 made for example of polycarbonate is in this embodiment perforated with three apertures. Two of them are closed off, fixedly, by two panels 112 and 113 for example made of glass. Thus, the fixed part is formed by the three elements 111, 112 and 113 extending in a same plane.

Rails, respectively an upper rail 114 and a lower rail 115, are attached to the face of the fixed part 11 oriented towards the interior of the vehicle. It can be noted that these rails are at a distance from the outline of the fixed part and do not take participate in or hamper the fixed joining of this part to the edge of the opening.

The rails 114 and 115 maintain and slidingly guide the sliding panel 12, which has a frame 121 connected to the rails.

According to the invention, the upper rail 114, at each of its ends, has a closing tip 131, 132. Thus, it is possible to obtain several dimensions of rail without difficulty. The rail 114 is made out of a structural element, for example made of aluminum, and cut out to the desired length. The tips 131, 132 are then assembled.

This is also the case for the lower rail 115 provided with tips 133 and 134.

Thus, with a same base (aluminum structure), it is possible to equip openings of varied sizes and/or having openings of varied dimensions. It is also easy to adapt to a rightward and/or leftward sliding motion as needed.

According to the invention, at least the tips 131 and 132 of the upper rail are equipped with straps 141, 142, for example made of polyurethane or more generally of flexible or semi-rigid elements which for example can be cables, strips of reinforced fabric, a link equipped with a metal frame etc.

These straps 141 and 142 extend along the fixed part 11, in this case vertically, until they reach the edge 1111 of the fixed part. In this way, the upper ends 1411 and 1421 of the straps will be glued to the edge of the opening during the gluing of the device to it. It is of course possible to plan that these straps will extend horizontally or along any angle. It is possible to provide for temporary fastening means, for example adhesive means, to maintain the straps along the fixed part before they are fixedly joined to the edges of the opening.

Figure 2:
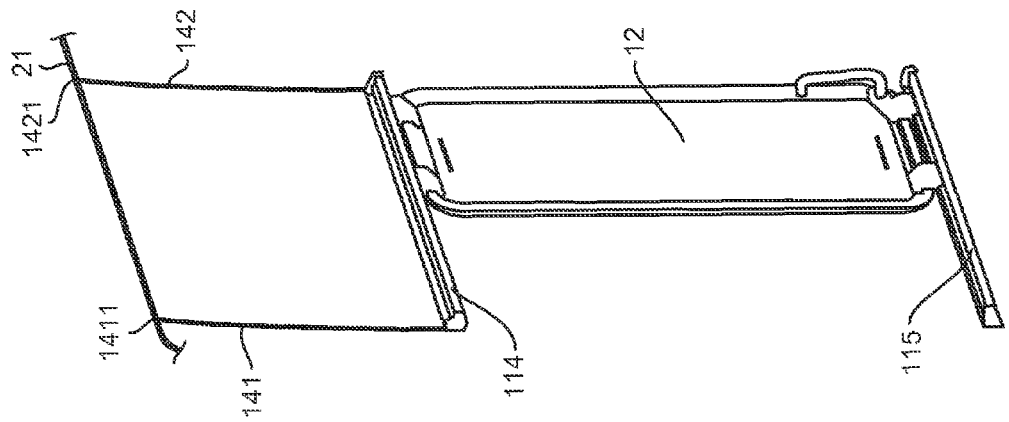
FIG. 2 illustrates the holding of the sliding panel of FIG. 1, according to this embodiment of the invention, in the event of breakage of the fixed part.

Thus, as illustrated in FIG. 2, in the event of breakage of the fixed part 11 (which therefore no longer appears in FIG. 2), the fixed panel 12 will remain suspended to the edge of the opening 21 which herein is the edge of the bodywork or a beam.

The straps 141 and 142 are fixedly joined by their ends 1411 and 1412 to the edge of the opening 21. They therefore hold the upper rail 114 which itself holds the sliding panel 12 which itself holds the lower rail 115. It can therefore be understood that, even when the fixed part 11 disappears, these different elements remain fixedly joined to the edge of the opening and therefore the structure. They are neither released nor hurled so as to ensure the safety of persons in proximity.

Figure 3B:
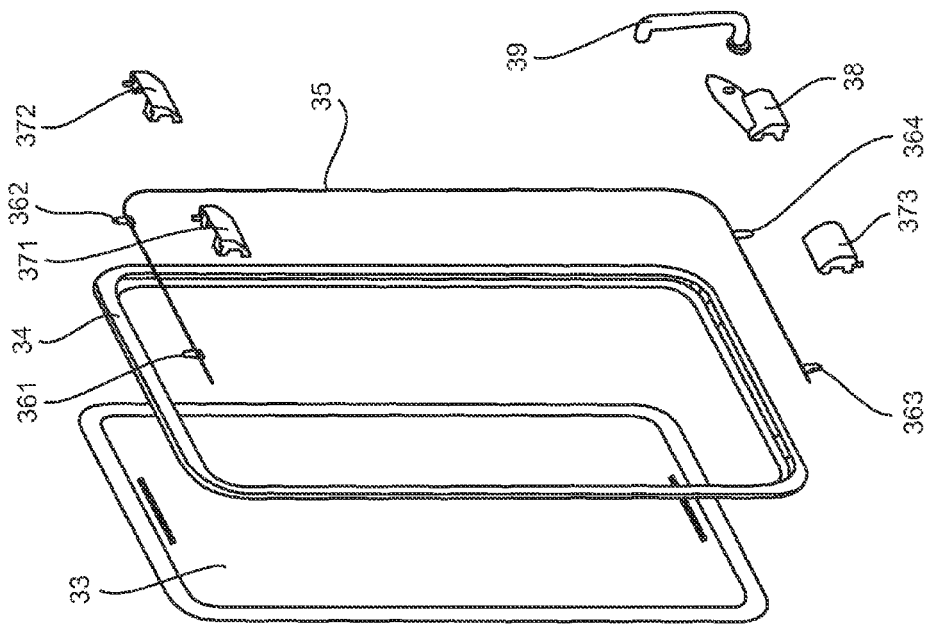
FIGS. 3A and 3B are exploded views of different constituent elements respectively of the fixed part and the sliding part of FIGS. 1 and 2.
Figure 3A:
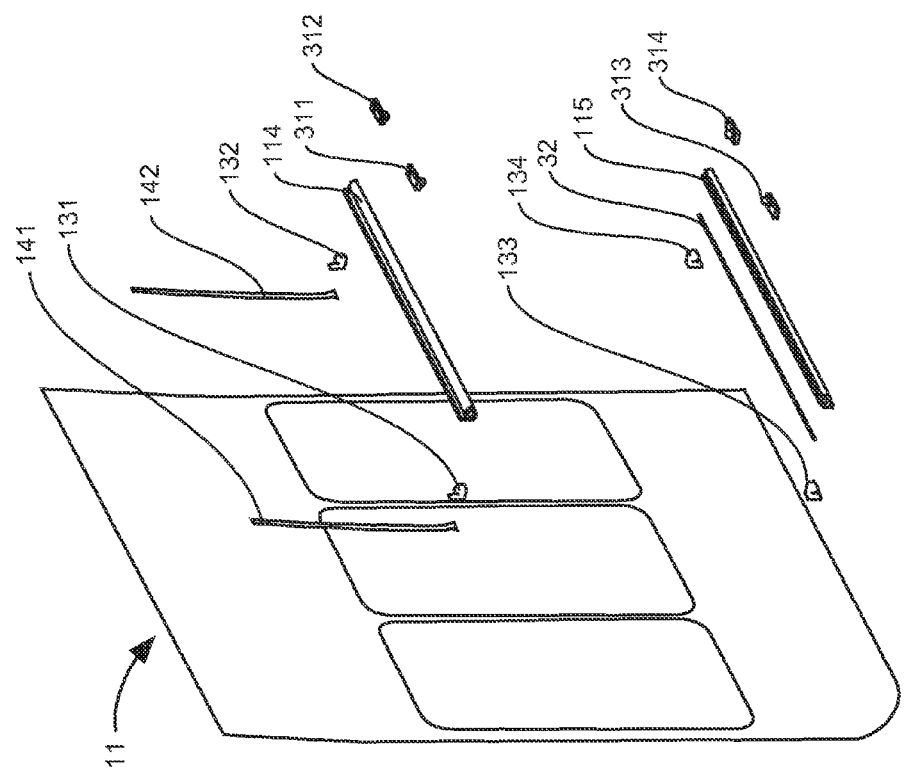

FIG. 3A provides a detailed description of the constituent elements of the fixed assembly which comprises, in addition to the fixed part 11 described here above, the two straps 141 and 142, the two upper tips 131 and 132, the upper rail 114, the lower rail 115 and its two lower ends 133 and 134.

The different tips are preferably equipped with a seal preventing the water collected in the rail from going out by its ends and/or water from penetrating by these ends into the rail. They can be clipped on and/or screwed on or more generally fixedly joined to the rails by all appropriate means. Preferably, a mode of fastening that enables easy dismantling will be chosen.

In this embodiment, the upper rail 114 has two shuttles 311, 312, and the lower rail 113 has two shuttles 313, 314, as well as a swaying stop unit 315. The implementing of these means, in cooperation with the corresponding means provided on the sliding panel illustrated in FIG. 3B, is not described in detail here below. It is presented in the patent application PCT/EP2010/058752, filed on the same day as the present application and incorporated by reference.

The optional presence of a water drainage seal 32, described in detail here below, can also be noted.

The mobile part illustrated in FIG. 3B therefore comprises a glass unit 33 mounted on or assembled with a frame 34 for example made of curved aluminum with brazed junctions. This frame 34 has a rack-forming cable 35, or a metal foil, on which there are mounted four identical pins for transmitting motion, two upper pins 361, 362 designed to cooperate respectively with the shuttles 311 and 312 and two lower pins 363, 364 designed to cooperate respectively with the shuttles 313 and 314.

Three identical swaying supports 371, 372 and 373 are mounted on the frame 34. A fourth support 38, which is slightly different, bears a handle 39 enabling the locking and control of the sliding of the mobile panel. The implementing of these different elements is described in detail in the document PCT/EP2010/058752 mentioned here above.

Other guiding mechanisms and especially those described in the different patent documents on behalf of the Holder of the present patent application can of course be implemented without departing from the framework of the invention.

FIG. 4 illustrates a first example of a tip 132 equipping the upper rail 114 and from which the strap 142 extends. FIG. 5A has another form of tip 131 from which the strap 141 extends.

In this latter embodiment and as described in FIG. 5B, the strap 141 can form a loop 51 or a hem around a tab 52 extending horizontally, and fixedly joined to the tip 131. This approach enables simple and efficient joining. Naturally, other modes of fixed joining can be envisaged, for example gluing, clamping, soldering etc.

As illustrated in FIG. 2, the rails and the sliding panel remain fixedly joined even in the event of breakage of the fixed panel. However, in certain embodiments, the assembly thus suspended can make a swaying motion which can be dangerous for the occupants. Similarly, in certain embodiments, a risk of disconnection may appear under the effect of a shock and/or the swaying motion.

It can therefore be desirable not only to hold the upper rail but also to hold, or at least to control, the shifting of the suspended assembly (a controlled motion enabling the energy to be absorbed). To this end, as illustrated in FIG. 6A, it can be planned to link the upper rail 114 and lower rail 115 by straps 61, 62. Thus, in the event of breakage of the fixed part, the distance between the rails remains substantially constant and the risk of disconnection of the mobile panel is limited.

The straps 61 and 62 can be distinct straps or they may constitute the extension of the straps 141, 142 respectively.

In another variant, illustrated in FIG. 6B, the lower rail 115 can itself be connected to the lower edge of the opening by straps 63, 64. Again, these may be distinct straps or extensions of the straps 141, 142 respectively. In the latter case, the straps 141 are held by their two ends to the edge of the opening (more specifically the upper edge and the lower edge of the opening) and tensioned. The rails are fixedly joined to these straps and therefore efficiently maintained even in the event of breakage of the fixed part.

FIGS. 7A to 7D schematically summarize four modes of implementation that can be envisaged:
  FIG. 7A: the straps extend between the upper and lower edges of the opening, and are fixedly joined to the two rails;
  FIG. 7B: the upper rail is connected to the upper edge of the opening by two first straps and the lower edge is connected to the lower edge of the opening by two second straps;
  FIG. 7C: the upper rail is connected to the upper edge of the opening by two first straps and the lower rail is connected to the upper rail;
  FIG. 7D: only the upper rail is held by straps.

Besides, again in order to provide for efficient fixed joining between the mobile panel and the rails, it can be planned to have safety-bolt means, i.e. means that counter the disconnection of a rail and the frame of the mobile panel.

FIGS. 8A and 8B are views in section illustrating a solution of this kind, respectively in the closed position and in the open position. They show the lower rail 115, fixedly joined to the fixed part 111. The sliding panel 12 carries the frame 34, equipped especially with a seal 71.

The rail 115 has a safety-locking strip 72 extending horizontally at its upper part and being inscribed within a corresponding housing 73 formed in the swaying support fixedly joined to the frame 34. This assembly makes it possible to control the sliding movement of the mobile panel along the strip 72.

It thus allows a shifting of the swaying if necessary (arrow 74) enabling the passage from the closed position (FIG. 8A) to the open position (FIG. 8B).

The rail 115 also presents two closing-off zones 75, 76 extending beneath the lower part 77 of the frame 34. The combination of the elements 72, 73, 75, 76 and 77 prevents any major shift vertically (arrow 78) and therefore the disconnection (unhinging) of the sliding panel from the lower rail 115.

A similar mechanism can of course be implemented for the upper rail.

According to another aspect of the invention it is desirable in certain embodiments to provide efficient solutions to ensure the tight sealing of the opening and the draining of condensation water which can appear on the lower face of the opening. This combines at least three aspects:
  ensuring the most perfect possible sealing when the mobile panel is closed to prevent the water from penetrating the vehicle including when there is a jet of pressurized water which can get introduced into the space between the mobile panel and the fixed part or through holes for removing water that are pierced into the fixed part;
  providing for the removal of water (for example in the event of rain or splashing water) which could penetrate through the aperture when the mobile panel is open;
  provide for the removal of condensation water appearing on the lower face of the opening when the mobile panel is closed.

The Holder of the present patent application has developed a particular solution to this problem described in the patent document EP-1 048 501. This solution is well suited to certain situations but does not enable a simple and speedy adaptation to different types of openings. Besides, it is not easy to implement in the case of rails formed in structural metal elements which can be cut to several dimensions. Indeed, the rails have to be planned, from the very outset, so as to direct water towards water passages connected to particular points of the rail.

To overcome this drawback, it is proposed in certain embodiments to implement a portion of a water-drainage seal along the lower rail. As will appear from the reading of the following description, this approach can be implemented independently of the use of straps or similar elements as described here above.

Indeed, there is provided a water drainage seal 32 extending between the fixed part 11 and the lower rail 115 (see FIG. 3A). This seal 32 provides a permeable barrier, i.e. it fulfils two functions which in principle could appear to be opposed when the sliding panel is closed:
  preventing any rising of water due to an external stream;
  enabling the drainage of condensation water.

To this end, a seal is used forming a permeable barrier made for example out of an open-cell foam having for example a 12 mm by 6 mm section.

The implementing of this seal is illustrated in FIGS. 9A to 9C. This is a view in section at a location where the swaying supports (FIG. 3B) are not present.

The fixed part 11 is perforated with water-draining holes 81, for example three in number. The lower rail 115 is bonded to this fixed part by a linking portion 1151 above these draining holes 81. The rail 115 also has an upper part 1152 for collecting water which is then removed towards the draining holes 81 by means of draining holes of the rail, not shown and placed so as to be offset relatively to the draining holes 81.

The rail 115 has a vertical wall 1153 parallel to the fixed part 11 (but not placed against it) and defining a housing with it for the water drainage seal 82. A slight extension 1154 can be planned to support and help the placing of the seal 84. It also makes it possible to reduce the water passage zone and break a jet of pressurized water.

As can be seen in FIG. 8A, illustrating the mobile panel 12 in an open position, the water can penetrate (arrow 85) into the vehicle through the space created by the shifting of the mobile panel 12 relatively to the fixed part 111. A part of this water can run off on to the upper part of the rail and then be directed towards the interior of the rail 115 (arrow 86). This water is then removed by the drainage holes made in the rail and then through the drainage holes 81. Another part of the water can fall on the seal 84 and flow towards the exterior in this seal 84 (arrow 86). Indeed, this seal 84 is permeable and enables the passage for example of water and/or its evaporation. In other words, the seal behaves like a sponge.

When the mobile panel 12 is closed as illustrated in FIG. 8B, the tight sealing between the mobile panel 12 and the fixed part 111 is provided classically by a seal 87. However, the water coming from the exterior, especially through a pressurized cleaning jet, can penetrate (88) through the hole 81. However, this water remains in the space 89 and emerges by the hole 81. The seal 84 then forms a barrier preventing any rise of water.

However, as illustrated in FIG. 8C, the condensation water appearing on the face turned towards the interior of the vehicle (arrow 810) falls on the seal 84. This permeable seal enables the passage of the water and/or its evaporation (arrow 811).

There is thus an efficient solution available for the removal of condensation water (which no longer has to be collected in the rail) and makes it also possible to provide for the efficiency of the sealing.

The invention claimed is:

1. A device for closing off an opening made in a structure of a vehicle, comprising:
    a fixed plane part in which an aperture is defined and at least one sliding panel guided along two rails mounted on a face of said fixed panel, said sliding panel being mobile between a closed position, closing off said aperture, and an open position, opening said aperture; and
    two first retaining elements formed of a strap, a cable, or a flexible link with a metal frame, a first end of each first retaining elements being fixedly joined to a closing tip mounted at one end of at least one of said rails, so that the first retaining elements are in contact with and fixedly attached to the at least one of said rails via the closing tip when the device is in an operational state, a second end of each first retaining elements being intended for being fixedly joined to said structure, and said first retaining elements being sized so that said second end can be glued to the edge of said opening by means of a glue seal intended for fixedly joining said part to said structure.

2. The device for closing off according to claim 1, wherein said rail is made out of a structural metal element capable of being cut out to different lengths.

3. The device for closing off according to claim 1, wherein said closing tips are fixedly joined to said rail by being clipped on or screwed on.

4. The device for closing off according to claim 1, wherein said first end forms a loop around a holding tab formed in said closing tip.

5. The device for closing off according to claim 1, wherein at least one of said closing tips is fixedly joined to a second flexible or semi-rigid element extending up to a tip of a second rail, so as connect the two rails.

6. The device for closing off according to claim 1, wherein at least one of said rails or said sliding panel carries unhinging prevention means preventing the disconnection of said rail and said sliding panel.

7. The device for closing off according to claim 6, wherein said unhinging prevention means comprise complementary elements, one of said complementary elements being formed on said rail and another one of said complementary elements being formed on a frame of said sliding panel, so as to eliminate or limit at least one degree of freedom between said rail and said frame.

8. The device for closing off according to claim 6, wherein said unhinging prevention means comprise complementary elements, one of said complementary elements being formed on said rail and another one of said complementary elements being formed on a swaying support fixedly joined to the frame of said sliding panel so as to eliminate or limit the degrees of freedom between said rail and said frame, except along the sliding axis.

9. The device for closing off according to claim 1, wherein a permeable seal is placed between said fixed part and said lower rail.

10. The device for closing off according to claim 9, wherein said seal is made out of open-cell foam.

11. The device for closing off according to claim 9, wherein said seal is placed above at least one passage of water pierced into said fixed part.

12. A motor vehicle, comprising:
    at least one device for closing off an opening made in a structure of the motor vehicle, the device comprising a fixed plane part in which an aperture is defined and at least one sliding panel guided along two rails mounted on a face of said fixed panel, said sliding panel being mobile between a closed position, wherein said aperture is closed, and an open position, wherein said aperture is opened; and
    two first retaining elements formed of a strap, a cable, or a flexible link with a metal frame, a first end of each first retaining elements being fixedly joined to a closing tip mounted at one end of at least one of said rails, so that the first retaining elements are in contact with and fixedly attached to the at least one of said rails via the closing tip when the device is in an operational state, a second end of each first retaining element being intended for being fixedly joined to said structure, and said first retaining elements being sized so that said second end can be glued to the edge of said opening by means of a glue seal intended for fixedly joining said part to said structure.

\* \* \* \* \*